United States Patent
Liao (10) Patent No.: US 7,378,826 B2
(45) Date of Patent: May 27, 2008

(54) METHODS AND CIRCUITS FOR OUTPUT OVER-VOLTAGE REDUCTION IN SWITCHING REGULATORS

(75) Inventor: Chiawei Liao, San Jose, CA (US)

(73) Assignee: Linear Technology Corp., Milpitas, CA (US)

( * ) Notice: Subject to any disclaimer, the term of this patent is extended or adjusted under 35 U.S.C. 154(b) by 219 days.

(21) Appl. No.: 11/326,731

(22) Filed: Jan. 5, 2006

(65) Prior Publication Data

US 2007/0152647 A1 Jul. 5, 2007

(51) Int. Cl.
*G05F 1/571* (2006.01)
(52) U.S. Cl. .................. 323/283; 323/284; 323/285
(58) Field of Classification Search ........ 323/282–285, 323/265
See application file for complete search history.

(56) References Cited

U.S. PATENT DOCUMENTS

| | | | | |
|---|---|---|---|---|
| 6,157,177 A * | 12/2000 | Feldtkeller | .................. | 323/267 |
| 6,538,419 B1 * | 3/2003 | Allen et al. | .................. | 323/285 |
| 6,828,766 B2 * | 12/2004 | Corva et al. | .................. | 323/284 |
| 6,987,380 B1 * | 1/2006 | Lee | ............................. | 323/285 |
| 7,030,596 B1 * | 4/2006 | Salerno et al. | .............. | 323/282 |
| 7,057,380 B2 * | 6/2006 | Kuo et al. | .................... | 323/284 |
| 7,109,694 B2 * | 9/2006 | Mihalka | ....................... | 323/283 |
| 2004/0135564 A1 * | 7/2004 | Huang et al. | ................ | 323/282 |
| 2005/0212502 A1 * | 9/2005 | Casey et al. | ................ | 323/284 |
| 2006/0113974 A1 * | 6/2006 | Kan et al. | .................... | 323/282 |
| 2006/0261792 A1 * | 11/2006 | Liao et al. | ................... | 323/282 |
| 2007/0075694 A1 * | 4/2007 | Xi et al. | ...................... | 323/282 |

\* cited by examiner

*Primary Examiner*—Jeffrey L. Sterrett
*Assistant Examiner*—Stuart Hansen
(74) *Attorney, Agent, or Firm*—McDermott Will & Emery LLP (57) ABSTRACT

Switching regulator Burst Mode control circuitry is provided for limiting voltage overshoot at the output of a switching regulator operating in power saving Burst Mode. The Burst Mode control circuitry may include regulator load current sensing circuitry which may be operative to put and maintain the regulator in the SLEEP state when the load current amplitude is below a threshold. The control circuitry may also include gated over-voltage comparator circuitry operative to reduce regulator output overshoot and to eliminate erroneous deactivation of the regulator switch circuitry when the regulator is not operating in Burst Mode. The gated over-voltage circuitry may include a one-shot timer circuit.

12 Claims, 8 Drawing Sheets

METHODS AND CIRCUITS FOR OUTPUT OVER-VOLTAGE REDUCTION IN SWITCHING REGULATORS

BACKGROUND OF THE INVENTION

This invention relates to output over-voltage reduction in switching regulators. Methods and circuits are provided for reducing voltage overshoot at the output of switching voltage regulators operating in burst mode.

Switching regulators are used to provide stable voltage and current supplies. Switching regulators may be used to produce DC voltages of various amplitudes from DC input voltages of smaller or greater amplitude than the output voltage. Switching regulators may also be used to produce DC voltages of various amplitudes from AC input voltages.

Switching regulator circuits consume power even when the regulator is supplying little or no power to a load. In order to reduce the power consumption of switching regulators when they are providing little or no power to their load, switching regulators may be configured to operate in a power saving mode, or Burst Mode™. When operating in the Burst Mode, a switching regulator may monitor the power being consumed at its output and may alternate between two states of operation, a SLEEP state and a WAKE state, depending on the output load power requirements. If the load requires little or no power, the regulator may go into the SLEEP state in which the regulator switching circuits are substantially turned OFF in order to conserve power. If the load requires more power, the regulator may go into the WAKE state in which the switching circuits are turned ON and supply power to the output load.

While switching regulators may include Burst Mode control circuitry operative to put the regulator in either the WAKE or SLEEP state depending on the load power requirements, the circuitry may detrimentally affect the performance of the regulator. For example, the circuitry may limit the regulator's ability to maintain a stable regulator output voltage or current by allowing the output signal to vary excessively. The circuitry may also cause the regulator to remain in the WAKE state even though the load no longer requires large amounts of power.

SUMMARY OF THE INVENTION

It would be desirable to provide improved Burst Mode control and over-voltage reduction methods and circuits for regulators. These methods and circuits preferably allow more precise control of the regulator output signal, and preferably more tightly controls continued operation of the regulator in the WAKE state.

The invention provides regulator Burst Mode control methods and circuits for controlling the state of a switching regulator. In addition, the invention provides gated over-voltage comparator methods and circuits for reducing regulator output voltage overshoot when the regulator is operating in the WAKE state.

Switching voltage regulators operative in Burst Mode may include Burst Mode control circuitry that selectively puts the regulator in the SLEEP or WAKE states. In current-mode switching regulators, for example, the Burst Mode control circuitry may include load current sensing circuitry operative to put and maintain the regulator in the SLEEP state when the current provided by the regulator switch circuit exceeds the load requirements and maintains the regulator switch circuit in a WAKE state when power is required by the load. The switching regulator may also include output voltage sensing circuitry operative to deactivate (or turn OFF) the regulator when the voltage at the output of the regulator exceeds a first threshold voltage. But, in such conventional switching-mode regulators, the control of operation is looser than optimal—i.e., the output may be allowed to vary even up to 8% overshoot level (or 4% DC output voltage in a 3 volt regulator) from a target value—because of other circuit considerations, such as worst case high ripple caused by heavy load transients.

The invention provides gated over-voltage comparator circuitry for selectively enabling or disabling the sensing circuitry responsible for providing burst WAKE regulation. The gated circuit may include a one-shot timer that preferably deactivates the sensing circuitry responsible for reducing overshoot. The circuitry preferably deactivates the sensing circuitry at all times except during a selectable period of time after the regulator enters the WAKE state.

It should be noted that this patent application is applicable to all switching regulators, whether current-feedback or voltage-feedback or some combination of the two systems.

BRIEF DESCRIPTION OF THE DRAWINGS

Further features of the invention, its nature and various advantages, will be more apparent from the accompanying drawings and the following detailed description.

DETAILED DESCRIPTION OF THE INVENTION

Switching regulator circuits are commonly used for providing stable DC voltages or currents to a load. Switching regulators include a switching circuit which periodically provides power to the output of the regulator. A common type of switching regulator is the pulse-width modulation (PWM) regulator, which relies on pulse width modulation to produce output signals of different amplitudes. PWM switching regulators vary the duty-cycle of the output signals they produce in order to adjust the amount of current supplied and the voltage level maintained at their output or outputs. The voltages supplied at the outputs of these regulators may depend on the ratio of the switch pulse width to the switch pulse period, a higher ratio producing a higher output voltage. Switching regulators may also rely on principles other than PWM for their operation.

Figure 1A:
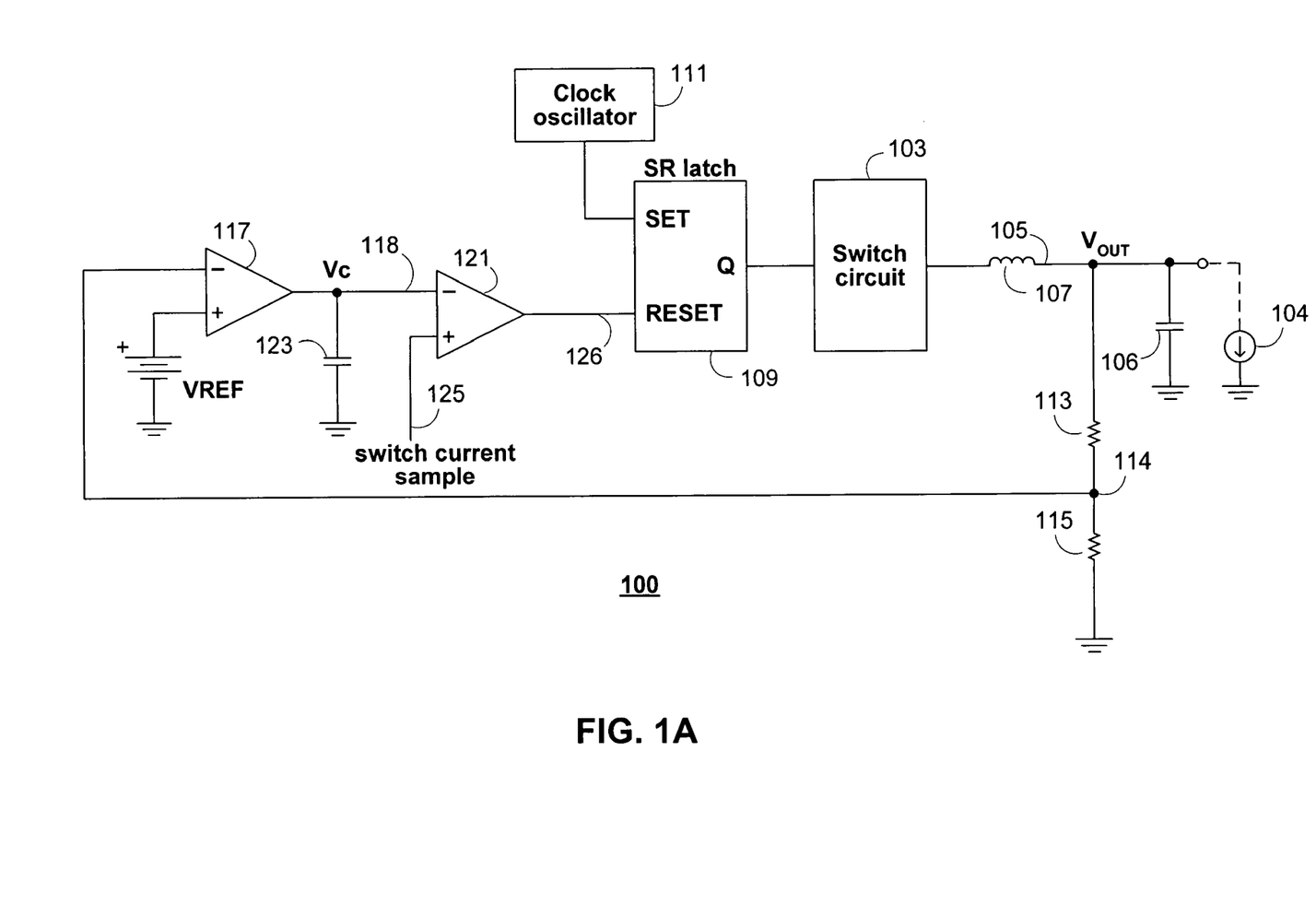
FIG. 1A shows a diagram of a switching regulator circuit including Burst Mode control circuitry.

The switching regulator goes into burst mode when output load is light (as indicated by the $V_C$ signal of FIG. 1A).

The burst mode consists of SLEEP modes and WAKE mode. In burst-sleep, most of the circuitries are turned OFF to save power, and output load is delivered by the output capacitor until output drifts lower than the regulated level, then it goes into burst-WAKE mode wherein regulator circuits are turned ON to drive output capacitor high until the output is higher than the regulated level. Then, the regulator goes into burst-SLEEP again. This cycle repeats until output load increases and the regulator goes into normal non-burst mode.

The invention preferably reduces the output overshoot in power saving Burst Mode only. Specifically, in burst-WAKE, output often overshoots due to slow regulator system loop response time. This overshoot level causes output to lose regulation.

In one embodiment, the invention preferably uses a one-shot timer together with an over-voltage comparator. This combination circuit is preferably only enabled during a limited time period in the burst-WAKE.

During this time period, the comparator may detect that the output overshoot is higher than the preset level. When the overshoot is detected, the comparator stops the regulator switch so that no more energy gets delivered to the output capacitor and output overshoot stops.

To reiterate, one reason the over-voltage comparator is one-shot timer gated is that when the regulator goes into normal non-burst mode, the comparator is disabled so that the comparator does not interfere with higher output ripple that results from heavy load change on the output.

The switching voltage or current at the output of the switch circuit of a switching regulator may be filtered to produce a DC, or near DC, regulator output signal from the switching signal. Filters including series combinations of inductive and capacitive elements are commonly used for this purpose. For example in FIG. 1A, inductive element 107 and capacitive element 106 are operative to filter the switching signal at the output of switch 103, and to produce a DC or near DC output signal at regulator output node 105.

Switching regulators that are used to supply both large and small output currents may have different modes of operation depending on the level of output current they are required to supply. When large output currents are required, the switching regulators may function in their normal mode of operation. However, when small output currents are required, the switching regulators may go into a power saving Burst Mode to reduce the amount of power consumed by the regulator circuitry. While in Burst Mode, the switching regulator may alternate between a SLEEP state, during which the principal circuits of the switching regulator are turned OFF, and a WAKE state, during which the switching regulator circuits are turned ON. A voltage-mode switching regulator may monitor the voltage at its output, and go into the WAKE state only when the output voltage drops below a specified threshold. Similarly, a current-mode switching regulator may monitor the current being delivered to a load coupled to its output, and go into the WAKE state only when the load pulls more than a specified threshold current. The voltage-mode regulator may return to the SLEEP state once the output voltage exceeds a second threshold, while the current-mode regulator may return to the SLEEP state once the load current drops below its second threshold.

FIG. 1A shows a switching regulator 100 including Burst Mode control circuitry. Regulator 100 acts to maintain a steady voltage supply $V_{OUT}$ at output node 105 regardless of the output load current 104 that the regulator is supplying. Regulator 100 may be a pulse width modulation regulator, or any other appropriate type of switching regulator. In the embodiment shown in FIG. 1A, regulator 100 may be a PWM regulator including any appropriate PWM switch circuit 103. Circuit 103 may alternatively be replaced by other switching regulator circuitry operative to provide current to the output node 105 and the output capacitive element 106 through output inductive element 107.

The output capacitive element 106 and output inductive element 107 act to smooth the bursts of output current provided by switch 103, in order to provide a stable DC output voltage at the output node 105. Inductive element 107 ensures that the current supplied by switch 103 to node 105 varies in a continuous fashion, thereby ensuring that discontinuities in current supplied at the output of switch 103 do not cause discontinuities in voltage at output node 105. Capacitive element 106 ensures that the output voltage at node 105 varies in a continuous fashion. Output capacitive element 106 may also store charge, and may act to maintain a stable output voltage without requiring the continuous operation of switch 103 and the circuitry of system 100 when the regulator is driving small output load currents 104. Output capacitive element 106 may be especially useful to maintain a stable output voltage and to provide small load currents 104 when regulator 100 is in a SLEEP state while operating in Burst Mode, for example.

Switching regulator 100 includes output current sensing circuitry used to control the state of the switching regulator while it is operating in Burst Mode. The output current sensing circuitry includes resistors 113 and 115 coupled in series between output node 105 and ground. Resistors 113 and 115 act as a voltage divider, providing at their shared node 114 a voltage proportional to the voltage at output node 105. Amplifier 117 senses the output voltage, $V_{OUT}$, and commands, via comparator 121 (which may be any suitable comparison circuit), the output current 125 to reflect $V_C$ 118 and, consequently, to regulate $V_{OUT}$. If $V_{OUT}$ is lower than the regulated level, $V_C$ goes higher to force the switch current 125 (which, as mentioned above, corresponds to the local current) higher by turning on switch 103 longer.

Signal 126 and SR latch 109 preferably provide regulator PWM duty cycle control. In this embodiment signal 126 and SR latch are preferably not used for controlling entry and exit from Burst Mode. It follows that $V_C$ 118 indicates the regulator output current. $V_C$ 118 can be compared to a predetermined level (or, in other words, threshold) to determine when to go into Burst Mode.

Figure 1B:
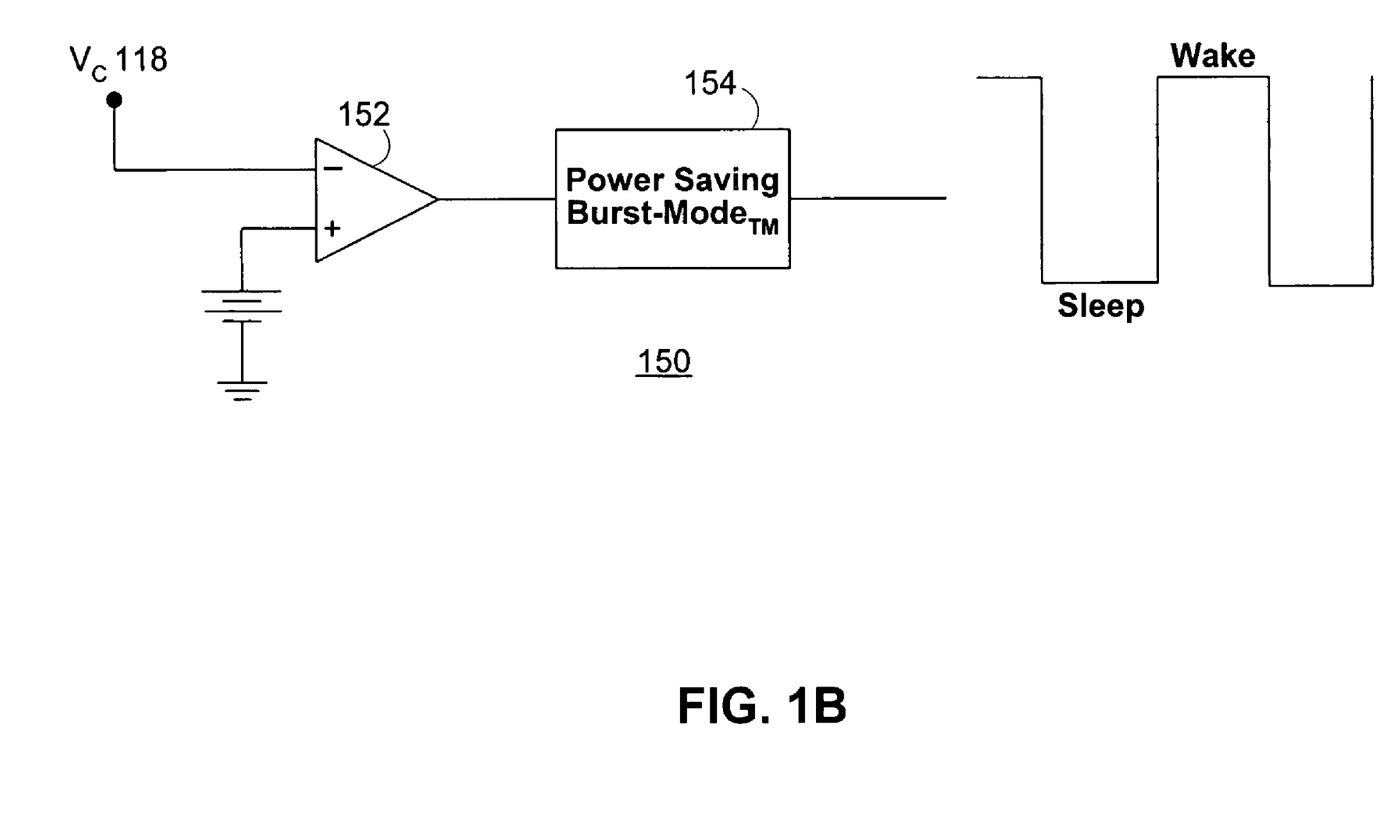
FIG. 1B shows a diagram of a portion of a switching regulator circuit directed to Burst Mode Circuitry.

FIG. 1B shows a $V_C$ 118 that corresponds to the output load current level. In one exemplary voltage regulator, when $V_C$ drops below 0.7 volts, comparator 152 forces the regulator into burst sleep mode via Power-saving Burst Mode circuit 154. In Burst Sleep mode, switch 103 (shown in FIG. 1A) turns OFF. The output drifts lower until $V_C$ drifts lower than the regulated output. Then $V_C$ 118 goes higher than 0.7 volts and the circuit is forced into burst wake mode. When the output load is higher, $V_C$ 118 will preferably always remain at a level higher than 0.7V, and preferably not go into Burst Mode.

Second comparison circuit 121, which may be an amplifier, a comparator, or any other comparison circuit, is operative to compare the voltage $V_C$ across capacitor 123 to a voltage at node 125 that is proportional to a switch current sample.

Since the output node 126 of comparison circuit 121 is coupled to the RESET input of SR latch 109, the LOW voltage level at node 126 ensures that SR latch 109 can be set. If the switch current sample is lower than $V_C$ 118, the output Q of SR latch 109 remains HIGH if the SR latch is set, or goes HIGH on the next rising edge of the clock signal produced by oscillator 111 coupled to the SET input of latch 109. Conversely, when the switch current is higher than $V_C$ 118, indicating that the switch is supplying excess current to the output, node 126 goes HIGH. Latch 109 then RESETs and its output Q goes LOW.

The output Q of latch 109 controls switch circuit 103 of switching regulator 100. When output Q of latch 109 is HIGH, switch circuit 103 is turned ON. Conversely, when output Q is LOW, switch circuit 103 is turned OFF.

Figure 2:
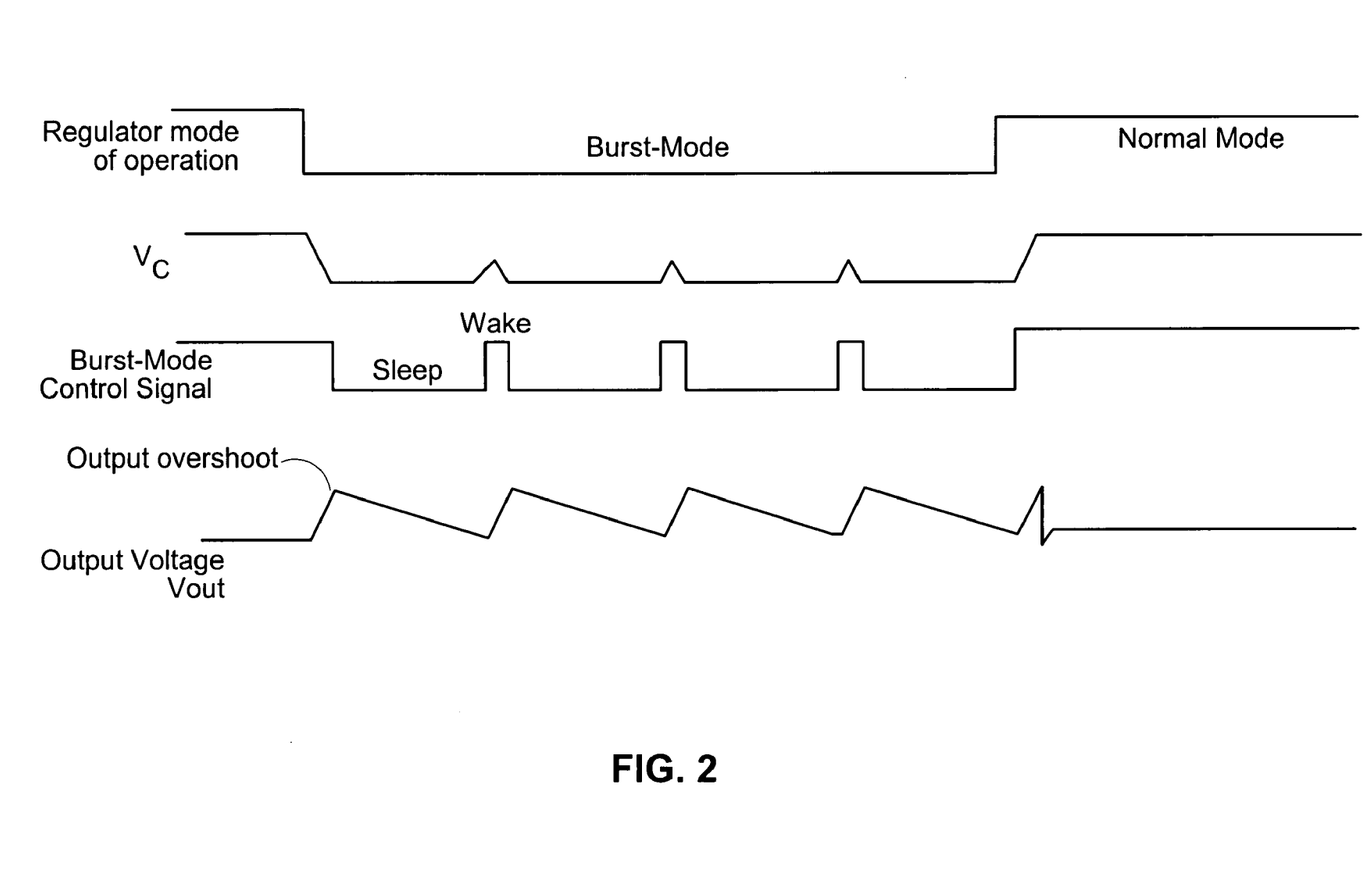
FIG. 2 shows a timing diagram of the basic switching regulator circuit shown in FIGS. 1A and 1B.

FIG. 2 shows an illustrative timing diagram showing the operation of a regulator in the normal and burst modes of operation. When a regulator is operating in normal mode, the output voltage $V_{OUT}$ is maintained at its desired DC level through the operation of the switching regulator circuitry. When the regulator is operating in the Burst Mode, the output voltage $V_{OUT}$ may be allowed to vary from its desired level. The regulator may operate in the Burst Mode when the load power requirements are reduced, for example. When the regulator enters Burst Mode, the regulator is in the WAKE state and the switching regulator circuitry continues to operate. Because of decreased load current requirements, the continued operation of the switching circuitry may cause the output voltage $V_{OUT}$ to increase and the $V_C$ voltage to decrease. Once $V_C$ reaches the threshold determined by $V_{REF}$, the regulator goes into the SLEEP state. In the SLEEP state, the regulator switching circuit is turned OFF and the output voltage $V_{OUT}$ drops off. As the output voltage $V_{OUT}$ drops off, the voltage $V_C$ increases until it reaches the level determined by $V_{REF}$. Once the voltage $V_C$ reaches the threshold level, the voltage at the output goes LOW and causes the regulator to go into the WAKE state. Once in the WAKE state, the regulator switch circuit is turned ON to provide power to the output of the regulator. The regulator continues to operate in this way as long as it remains in Burst Mode.

While the output current sensing circuitry described in the context of FIGS. 1A and 1B acts to maintain a stable regulated output voltage, the sensing circuitry may allow the output voltage to overshoot the desired regulated voltage when the regulator is in the WAKE state. Because of delays in signal transmission through the circuit, the regulator may have a non-negligible system response time separating the time at which the output voltage reaches the threshold voltage and the time at which the system should enter the SLEEP state. The system response time may also be affected by the dynamic response of the inductive element 107 and capacitive element 106 at output node 105, as well as by other inductive or capacitive circuit loading in the circuit.

During the delay caused by the system response time, because the regulator switch 103 is still driving a high current at its output, the output voltage at node 105 typically overshoots the threshold voltage. The percentage overshoot level commonly increases with decreasing output voltage levels. In regulators operative to maintain a 3V output level, for example, the overshoot levels typically reach 8% above the desired output voltage amplitude. In addition to causing larger amplitude voltage variations at the regulator output, the 8% overshoot may result in a DC output voltage level that is 4% higher than the desired level. The output voltage overshoot may be influenced by such factors as the regulator input and output voltage levels, the size of inductive element 107 and capacitive elements 106 and 123, as well as other factors.

In order to reduce the overshoot at the output of regulator 100, additional output sensing circuitry may be used. In particular, overshoot sensing circuitry may be used to cause the regulator switch circuit to turn OFF when the output voltage exceeds a particular overshoot level.

Figure 3:
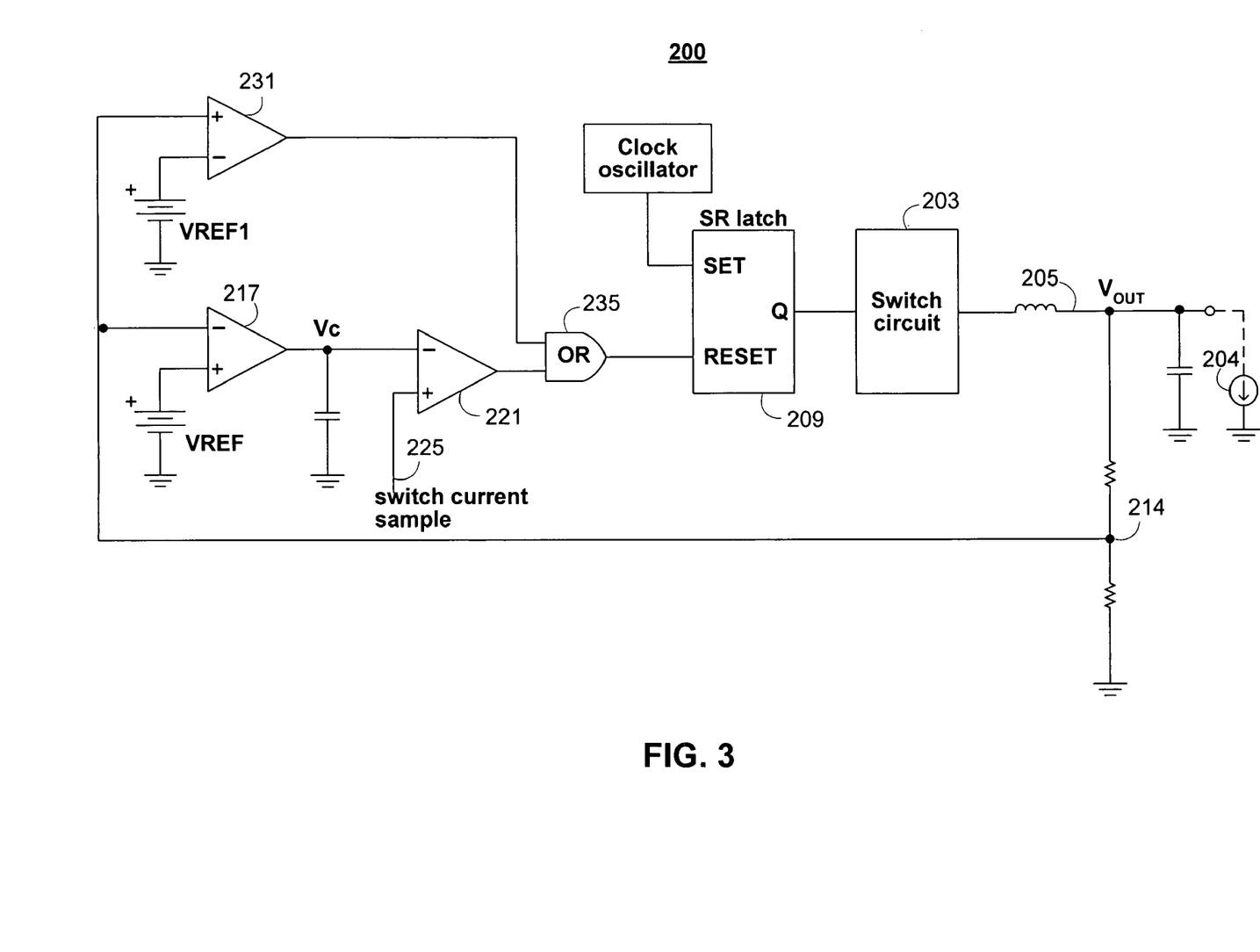
FIG. 3 shows a diagram of a switching regulator circuit including control circuitry and over-voltage circuitry.

FIG. 3 shows a second switching regulator 200 that incorporates overshoot reduction circuitry. Switching regulator 200 includes similar circuitry to switching regulator 100. Similar components in regulators 100 and 200 are identified by corresponding numbers offset by a factor of one hundred.

Regulator 200 also includes additional circuitry to that shown in FIGS. 1A and 1B. In particular, regulator 200 includes over-voltage comparison circuit 231 and OR gate 235, which are operative to reset latch 209 when the voltage at output node 205 exceeds a threshold determined by $V_{REF1}$. Comparison circuit 231, which may be an amplifier, a comparator, or any other comparison circuit, produces an output signal proportional to the difference between the voltage at node 214 and a second reference voltage $V_{REF1}$. The output of comparison circuit 231 is coupled to an input of OR gate 235, the output of OR gate 235 being coupled to the RESET input of latch 209. Comparison circuit 231 is therefore operative to reset latch 209 whenever the voltage at node 214 exceeds the $V_{REF1}$ threshold voltage. When the regulator output voltage exceeds the level determined by threshold $V_{REF1}$, latch 209 is reset and the regulator switch circuit 203 is turned OFF. It should be noted that the second input of OR gate 235 is coupled to the output of second comparison circuit 221. Second comparison circuit 221, which may be an amplifier, a comparator, or any other comparison circuit, functions in the same way as comparison circuit 121 of regulator 100.

The threshold voltage level $V_{REF1}$ at which comparison circuit 231 may be set so as to minimize overshoot in the output voltage of the regulator. In order to minimize overshoot, threshold $V_{REF1}$ may be set, for example, at a value 8% above the desired regulated output voltage level. Threshold $V_{REF1}$ may be set higher or lower, depending on the requirements of the regulator. However, if the threshold voltage is set too low, output voltage transients at node 205 may cause the output voltage $V_{OUT}$ to exceed the threshold voltage determined by $V_{REF1}$, and may cause comparison circuit 231 to mistakenly turn OFF switch circuit 203. Output voltage transients, or output voltage ripples, may be caused by heavy load transients. Erroneous deactivation of switch circuit 203 may be especially problematic when the regulator is not operating in Burst Mode, and when a load requires large amounts of power. Under these conditions, even a momentary deactivation of the regulator switch circuit 203 may cause the voltage or current supplied at the regulator output to drop off quickly. In order to avoid erroneous deactivation of switch circuit 203, the threshold level set by $V_{REF1}$ must be set high enough to exceed the maximum transient output voltage ripple. However, as $V_{REF1}$ is increased, the range of output voltages supplied by the regulator increases. If $V_{REF1}$ is set too high, large output voltage variations may limit the performance of regulator 200, especially in applications in which stable regulator output voltages are required.

Figure 4:
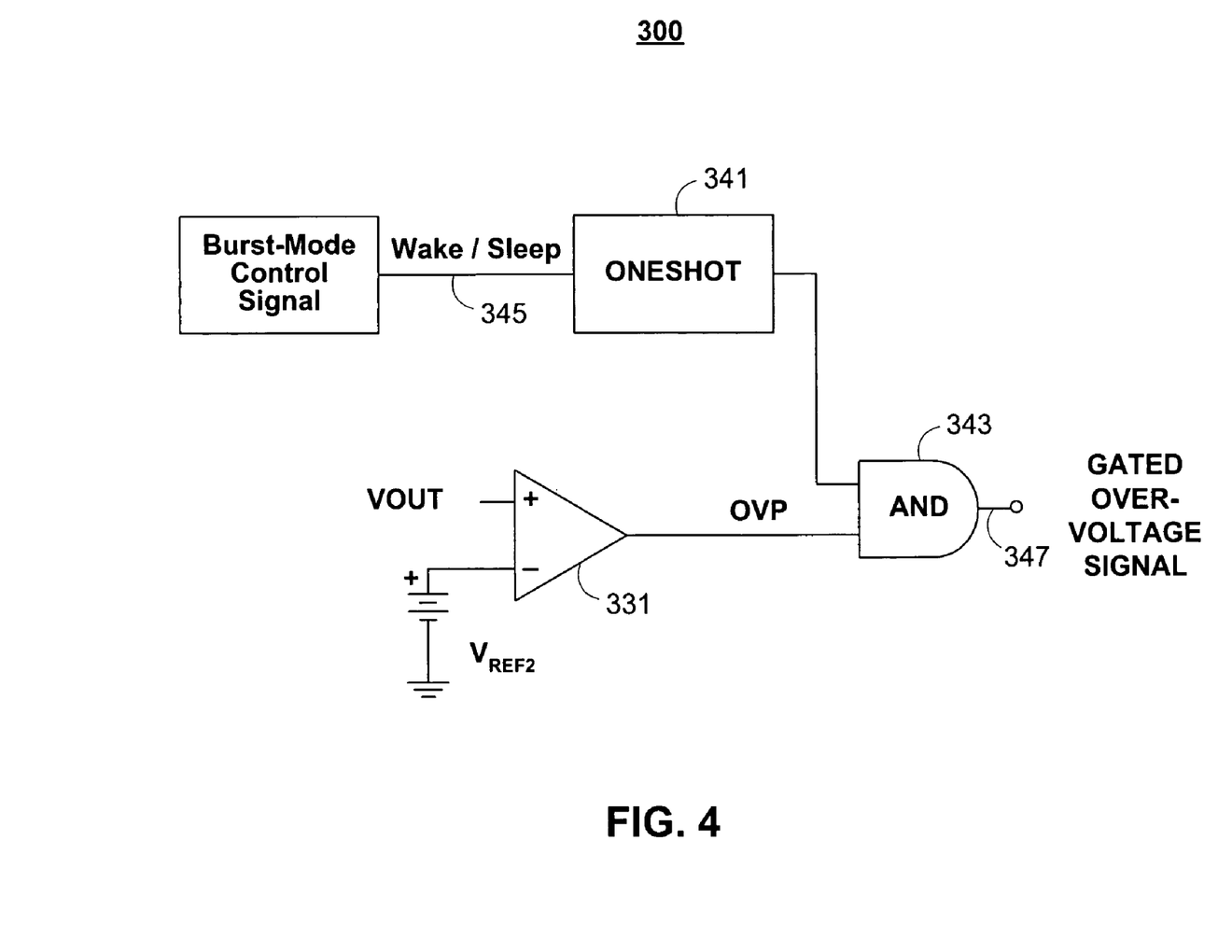
FIG. 4 shows a diagram of a gated over-voltage comparator circuit in accordance with the principles of the invention.

FIG. 4 shows a gated over-voltage comparator circuit 300 in accordance with the principles of the invention. Gated over-voltage comparator circuit 300 may be used in conjunction with over-voltage comparator circuitry such as circuitry 200 to improve the performance of switching regulator 200. Gated over-voltage comparator circuit 300 enables the output over-shoot threshold $V_{REF2}$ to be lowered and the regulator output voltage range to correspondingly be reduced.

Circuitry 300 includes a one-shot timer 341 which restricts the operation of the over-voltage circuitry to a limited period of time $T_1$ following the switching regulator coming out of the SLEEP state. The one-shot timer receives at its input 345 a Burst Mode control signal that may be indicative of the state of the voltage regulator. The Burst Mode control signal may, for example, be a control signal used to control the state of the voltage regulator. In one embodiment, the Burst Mode control signal at node 345 may be based on measurements of the load current. For example in regulator 100 of FIGS. 1A and 1B the Burst Mode control signal may correspond to the signal at the output of comparison circuit 152. The Burst Mode control signal may be HIGH when the voltage regulator is in the WAKE state, and LOW when the regulator is in the SLEEP state. The one-shot timer 341 may be rising edge triggered, to produce an output signal that is HIGH for a period $T_1$ following the regulator entering the WAKE state, and LOW the rest of the time. Period $T_1$ during which the one-shot circuit maintains a HIGH output may be fixed, selectable, or programmably selectable. The operation of one-shot timer 341 ensures that overshoot protection is provided only immediately following the rising edge of the WAKE state, but not in any other state such as normal (non-burst) mode operation.

Figure 5:
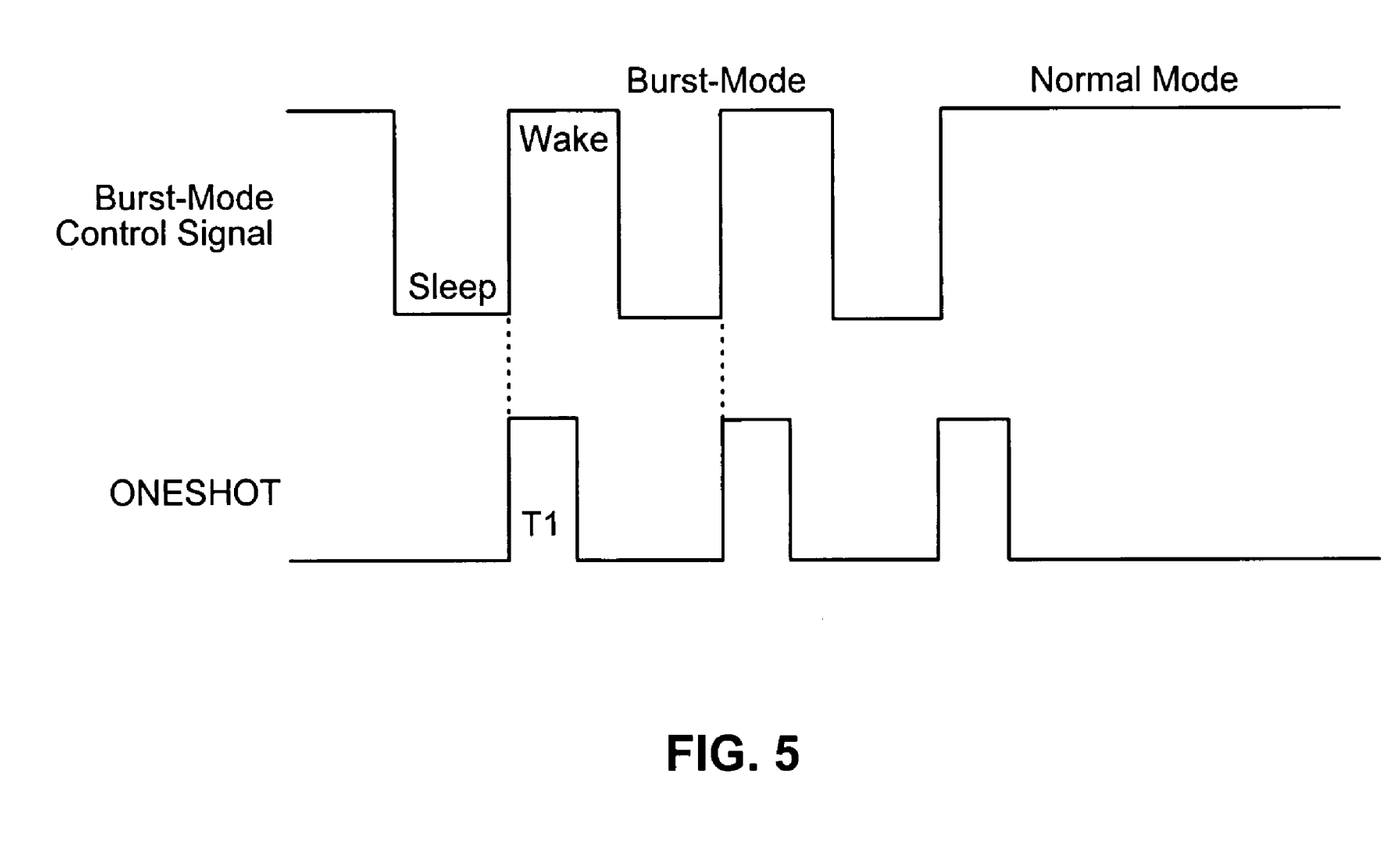
FIG. 5 shows a timing diagram of the gated over-voltage comparator circuit shown in FIG. 4.

FIG. 5 shows a timing diagram illustrating the operation of one-shot timer 341. The one-shot timer receives at its input the Burst Mode control signal shown in the upper portion of FIG. 5, and produces at its output the one-shot signal shown in the lower portion of the figure. When the regulator is operating in the Burst Mode, the Burst Mode control signal intermittently alternates between the SLEEP and WAKE states. Every time the Burst Mode control signal transitions into the WAKE state, corresponding to a rising edge in the Burst Mode control signal, one-shot timer 341 produces a HIGH output signal for a period $T_1$ following the rising edge. When the regulator is operating in the normal (non-burst) mode the one-shot timer is generally not activated. The one-shot timer maintains a LOW output for the remainder of Burst Mode and normal mode operation following the initial $T_1$ period. It should be noted, however, that the one-shot timer may be activated for a period $T_1$ after the regulator enters normal mode.

The output signal produced by one-shot circuit 341 may be used to selectively enable the operation of regulator Burst Mode control circuitry immediately following the commencement of the WAKE state. In circuit 300, the output of one-shot circuit 341 is coupled to one input of AND gate 343. The other input of AND gate 343 may be coupled to other regulator Burst Mode control circuitry such as comparison circuit 331. In this configuration, AND gate 343 is operative to transmit the output signal of comparison circuit 331 to the output 347 of the gated over-voltage control circuit when the output of one-shot timer 341 is HIGH. The gated over-voltage circuit therefore effectively allows the signal at the output of comparison circuit 331 to be transmitted to the output 347 of the circuit for a limited period of time $T_1$ following the regulator entering the WAKE state. The output over-voltage circuit 300 thus selectively enables the over-voltage comparison circuit 331 during a predetermined period $T_1$ following entry into the WAKE state, and disables the comparison circuit output at other times.

Figure 6:
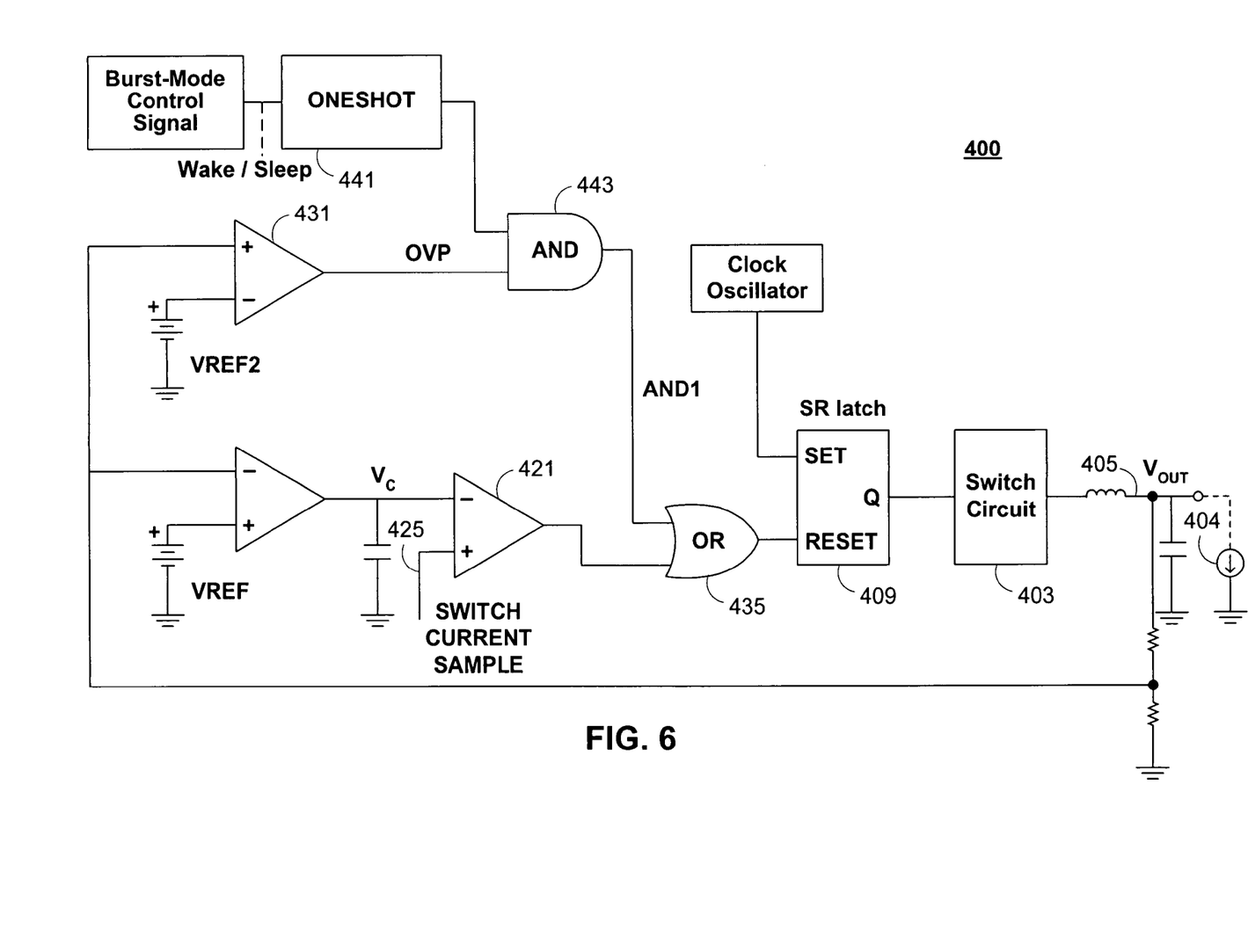
FIG. 6 shows a diagram of a switching regulator circuit including gated over-voltage circuitry in accordance with the principles of the invention.

In a preferred embodiment of the invention, gated over-voltage comparator circuit 300 may be used in conjunction with regulator control circuitry such as circuit 200 in order to provide improved regulator control circuitry. Such improved switching regulator control circuitry is shown in FIG. 6. Circuit components of regulator control circuit 400 are numbered to correspond to similar components of circuits 100, 200 and 300. For example, the one-shot circuit 441 and AND gate 443 of circuit 400 operate in an identical fashion as one-shot circuit 341 and AND gate 343 of circuit 300. AND gate 443 is operative to transmit the signal at the output of comparison circuit 431 to the input of OR gate 435 during a period $T_1$ after the regulator enters the WAKE state.

Similarly, comparison circuits 421 and 431 operate in a manner similar to comparison circuits 221 and 231 of FIG. 3. However, unlike its counterpart in circuit 200, comparison circuit 431 is only operative to reset latch 409 and turn OFF switch circuit 403 when the output voltage 405 exceeds the threshold determined by $V_{REF2}$ (which may preferably be set at 1%-2% higher than the preferred value of the output voltage) during period $T_1$ following the regulator entering the WAKE state. Depending on the value of $T_1$, one-shot timer 441 may limit the operation of comparison circuit 431 to periods in which the regulator is transitioning from the SLEEP state to WAKE state and the period immediately following this transition, the length of the period immediately following the transition as determined by the operation of one-shot circuit 341. It should be noted that following its ON period, one-shot timer 441 is preferably reset in order to be ready to turn ON at the next transition from SLEEP state to WAKE state.

Figure 7:
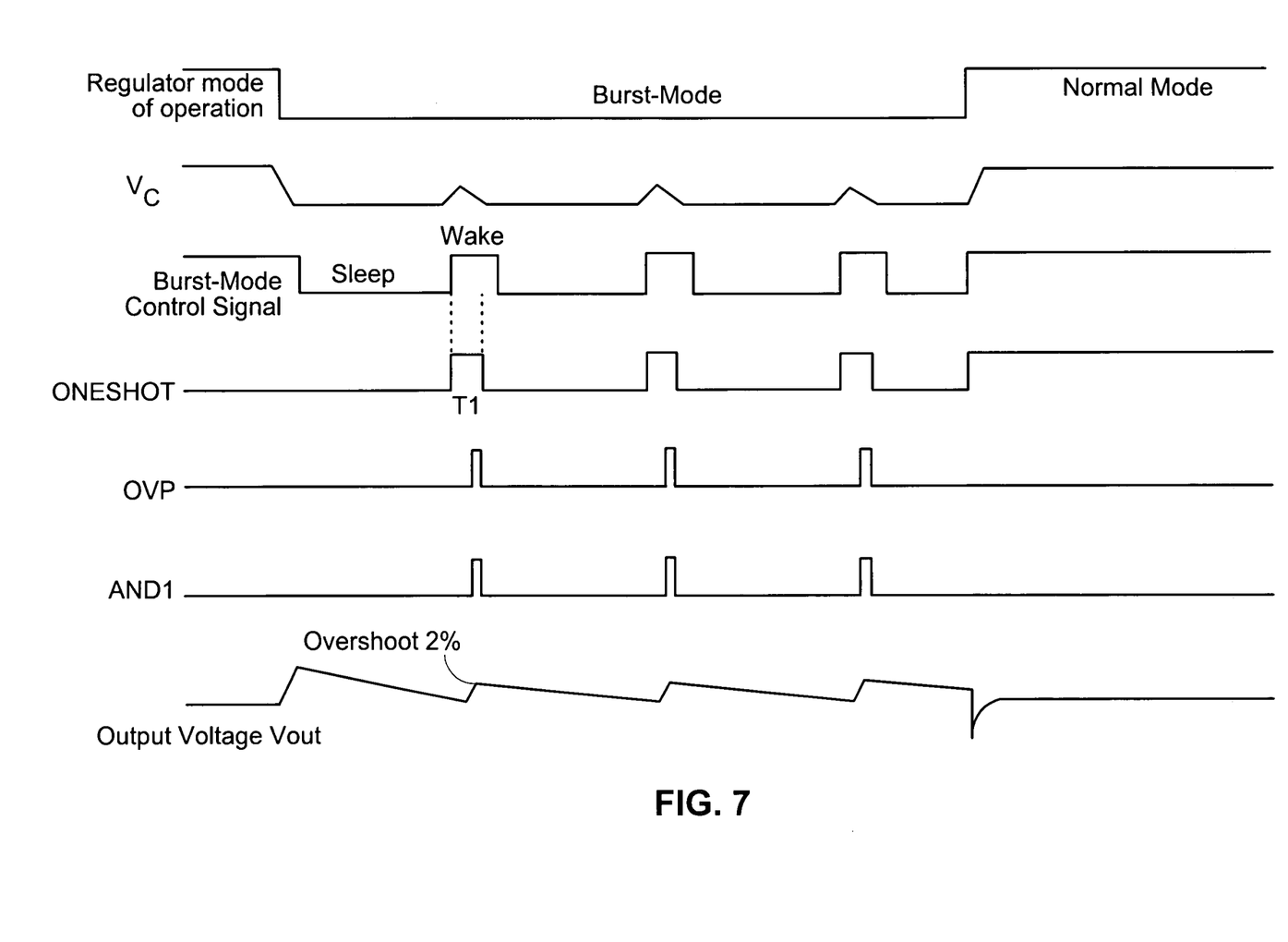
FIG. 7 shows a timing diagram of the switching regulator circuit including gated over-voltage circuitry shown in FIG. 6.

FIG. 7 shows a timing diagram illustrating the operation of regulator 400. The regulator may operate in two modes of operation. While operating in the normal mode, the regulator maintains a stable signal $V_{OUT}$ at its output by continuously regulating the switching of switching circuit 403. While operating in power saving Burst Mode, the regulator Burst Mode control circuitry produces a Burst Mode control signal used to turn the regulator switching circuitry ON and OFF.

As described in relation to the timing diagram of FIG. 2, the regulator current-sensing circuitry may be operative to put the regulator in the SLEEP state when the switch current exceeds the load current. In addition, voltage overshoot circuitry present in regulator 400 controls the operation of the regulator and prevents the output voltage amplitude $V_{OUT}$ from exceeding a specified threshold. As shown in FIG. 7, one-shot timer 341 is activated for a period $T_1$ following the entry into the WAKE state. During this period, if the output $V_{OUT}$ exceeds threshold $V_{REF2}$ and causes signal OVP to go HIGH, the output signal AND1 of AND gate 443 will go HIGH. Latch 409 will be reset, and the switch circuit 403 will be turned OFF. Because switch 403 is turned OFF, the output voltage $V_{OUT}$ will stop rising—thus limiting any output voltage overshoot.

In the output voltage $V_{OUT}$ trace shown in FIG. 7, for example, the output overshoot is reduced during those portions of the WAKE state in which the ONESHOT signal is HIGH. The output voltage may overshoot the output threshold at some point during WAKE state, but is preferably maintained within a threshold window that is closer to the desired output voltage than the threshold window provided by prior art circuitry. Thus, the gated over-voltage comparator circuit effectively prevents output voltage overshoot during at least a portion of WAKE state operation.

The period $T_1$ during which the over-voltage comparison circuit 431 is operative to deactivate regulator switch circuit 403 may be programmable. In one embodiment, this value may be programmed by using a programmable one-shot circuit or other suitable circuit.

As described previously, the gated over-voltage comparator circuit effectively disables comparison circuit 431 at all times except during a predetermined period of time $T_1$ after entering the WAKE state. When the regulator is operating in normal mode, the regulator does not enter burst mode. Because the regulator does not alternate between states, the regulator control circuitry disables comparison circuit 431 at all times. The regulator control circuitry thereby ensures that the comparison circuit does not cause the regulator to mistakenly turn OFF the regulator switching circuitry when the regulator is operating in the normal mode. In addition, because comparison circuit 431 is preferably only enabled in WAKE state of the Burst Mode, the threshold voltage $V_{REF2}$ of comparison circuit 431 can be set substantially lower than the threshold voltage $V_{REF1}$ of comparison circuit 231. Threshold $V_{REF2}$ may preferably be set so as to limit the amplitude of voltage variations at the regulator output 405, and to ensure that the output voltage remains within a limited range of the desired regulator output voltage. For example, as shown in FIG. 7, $V_{REF2}$ may be set to limit output voltage 405 to be at most 2% above the desired regulator output voltage level. $V_{REF2}$ may also be set to any other appropriate value.

It will be understood that the foregoing is only illustrative of the principles of the invention, and that various modifications can be made by those skilled in the art without departing from the scope and spirit of the invention. The particular circuit implementations shown herein are presented for purposes of illustration and not of limitation, and other constructions and embodiments can be used instead if desired.

The invention claimed is:

1. A switching regulator Burst Mode control circuit operative to produce a regulator Burst Mode control signal, the control circuit comprising:
a first comparison circuit to produce a first regulator control signal;
a one-shot timer responsive to receiving at its input a Burst Mode control signal to selectively transmit the first regulator control signal to an output of the Burst Mode control circuit during a period of time following activation of the one-shot timer; and
a second comparison circuit operative to receive at one input node a sample current, to receive at another input node a signal indicative of the amplitude of the current being supplied by a switching regulator switch to the regulator output, and to produce a second regulator control signal based on a comparison of the sample current with the current being supplied to the regulator output.

2. The control circuit of claim 1, wherein the Burst Mode control signal received at the input of the one-shot timer is the second regulator control signal.

3. The control circuit of claim 1, further comprising:
Combinational logic, wherein the combinational logic is operative to receive the first regulator control signal during the period of time following activation of the one-shot timer, to receive the second regulator control signal, and to produce a regulator Burst Mode control signal at an output of the Burst Mode control circuit based the first and on the second regulator control signals.

4. The control circuit of claim 3, wherein the combinational logic comprises a latch, and wherein the latch is set by a clock signal and is reset in response to one of (1) the first, (2) the second, and (3) both the first and the second regulator control signals.

5. A switching regulator comprising the control circuit of claim 1.

6. The circuit of claim 1, the first comparison circuit operative to receive at one input node a signal indicative of the voltage at the output of the regulator, to receive at another input node a voltage threshold signal, and to produce a first regulator control signal in response to the signal indicative of the voltage and the output of the regulator and the voltage threshold signal.

7. A method for producing a regulator Burst Mode control signal for a switching regulator, the regulator Burst Mode control signal operative to selectively put the regulator in SLEEP or WAKE states, the method comprising:
estimating the amplitude of a load current being supplied by the switching regulator to a load coupled to an output of the switching regulator;
producing a first regulator control signal, the first regulator control signal indicating whether the estimated amplitude of a load current is smaller than a threshold current level;
producing a second regulator control signal, the second regulator control signal indicating whether the amplitude of the voltage at the output of the switching regulator is greater than a threshold voltage level;
selectively transmitting the second regulator control signal;
producing the regulator Burst Mode control signal from a logical combination of the first regulator control signal and the selectively transmitted second regulator control signal; and
wherein the producing the regulator Burst Mode control signal further comprises producing a latch output signal wherein the latch is reset when (1) the estimated amplitude of a load current is smaller than the threshold current level, when (2) the amplitude of the voltage at the output of the switching regulator is greater than the threshold voltage and the second regulator control signal is transmitted, or when both (1) and (2) occur.

8. The method of claim 7, wherein the regulator is in the SLEEP state when the first regulator control signal indicates that the estimated amplitude of the load current is smaller than the threshold current level.

9. The method of claim 7, wherein the regulator is in the WAKE state when both the first regulator control signal indicates that the estimated amplitude of the load current is greater than the threshold current level and the second regulator control signal indicates that the amplitude of the voltage at the output of the switching regulator is smaller than the threshold voltage level.

10. The method of claim 7, wherein the period of time is programmable.

11. A switching regulator comprising:
a clock oscillator;
a latch that receives clock signals from the clock oscillator;
a switch circuit that is operative in response to signals from the latch;
an inductor that receives power via the switch circuit; and
a switching regulator Burst Mode control circuit operative to produce a regulator Burst Mode control signal, the control circuit comprising:
a first comparison circuit operative to receive at one input node a signal indicative of the voltage at the output of the regulator, to receive at another input node a voltage threshold signal, and to produce a first regulator control signal; and
a one-shot timer receiving at its input a Burst Mode control signal, the Burst Mode control signal that activates the one-shot timer, the one-shot timer operative to selectively transmit the first regulator control signal to an output of the Burst Mode control circuit only during a period of time following activation of the one-shot timer.

12. The switching regulator of claim 11, further comprising:
  a second comparison circuit operative to receive at one input node a sample current, to receive at another input node a signal indicative of the amplitude of the current being supplied by a switching regulator switch to the regulator output, and to produce a second regulator control signal based on a comparison of the sample current with the current being supplied to the regulator output.

* * * * *